US006585382B1

(12) United States Patent
Stone

(10) Patent No.: US 6,585,382 B1
(45) Date of Patent: Jul. 1, 2003

(54) OPTICAL SYSTEMS USING SWITCHED MIRRORS

(75) Inventor: Thomas W. Stone, Hellertown, PA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/587,661

(22) Filed: Jun. 5, 2000

Related U.S. Application Data

(63) Continuation-in-part of application No. 09/102,700, filed on Jun. 22, 1998, now Pat. No. 6,072,923, which is a continuation-in-part of application No. 08/734,139, filed on Oct. 21, 1996, now Pat. No. 5,771,320, which is a continuation-in-part of application No. 08/640,187, filed on Apr. 30, 1996, now Pat. No. 5,692,077, and a continuation-in-part of application No. 08/641,195, filed on Apr. 30, 1996, now Pat. No. 5,706,383.

(51) Int. Cl.$^7$ ................................................. G02B 5/26
(52) U.S. Cl. ..................... 359/839; 359/838; 359/850; 359/7; 359/15; 359/572; 385/16; 385/17; 385/18; 385/37
(58) Field of Search ................... 359/7, 838, 15, 359/839, 572; 385/10, 37, 40, 18, 16, 17

(56) References Cited

U.S. PATENT DOCUMENTS

| 4,013,000 A | 3/1977 | Kogelnik ...................... 350/96 |
| 4,236,783 A | 12/1980 | Hepner et al. ............ 350/96.13 |
| 4,871,235 A | 10/1989 | Greene et al. .................. 350/354 |
| 4,947,459 A | 8/1990 | Nelson et al. ................ 455/612 |
| 5,009,477 A | 4/1991 | Alferness et al. .............. 350/96 |
| 5,036,042 A | 7/1991 | Hed ............................. 359/237 |
| 5,133,027 A | 7/1992 | Funazaki et al. ................ 385/5 |
| 5,172,258 A | 12/1992 | Verber ......................... 359/138 |
| 5,218,198 A | 6/1993 | Bristow et al. ......... 250/227.24 |
| 5,255,332 A | 10/1993 | Welch et al. ................... 385/17 |
| 5,319,492 A * | 6/1994 | Dorn et al. ................... 359/296 |
| 5,375,004 A | 12/1994 | Ogura .......................... 359/139 |
| 5,438,444 A | 8/1995 | Tayonaka et al. ............ 359/123 |
| 5,461,687 A | 10/1995 | Brock ........................... 385/37 |
| 5,491,762 A | 2/1996 | Deacon et al. ................. 385/16 |
| 5,532,855 A | 7/1996 | Kato et al. .................... 359/117 |
| 5,546,483 A | 8/1996 | Inoue et al. .................... 385/14 |
| 5,619,365 A | 4/1997 | Rhodes et al. ............... 359/248 |
| 5,627,672 A | 5/1997 | Rhodes et al. ............... 359/248 |
| 5,636,138 A | 6/1997 | Gilbert et al. ............... 364/512 |
| 5,640,256 A * | 6/1997 | De Vreet et al. ................ 359/3 |
| 5,644,369 A * | 7/1997 | Jachimowicz et al. ......... 349/10 |

(List continued on next page.)

FOREIGN PATENT DOCUMENTS

| WO | WO96/08932 | 3/1996 |

OTHER PUBLICATIONS

T. Stone and N. George, "Wavelength Performance of Holographic Optical Elements," Applied Optics, 24, 3797 (1985).

W. Ng, A. Walston, G. Tangonan, I. Newberg, and J. J. Lee, "Wideband Fibre–Optic Delay Network for Phased Array Antenna Steering, " Electronics Letters, 25, 1456 (1989).

(List continued on next page.)

*Primary Examiner*—Cassandra Spyrou
*Assistant Examiner*—Craig Curtis

(57) ABSTRACT

An optical system having at least one switched mirror for switching and routing at least one incident beam of electromagnetic radiation. The switched mirrors are controlled by a voltage source and based upon the desired controllability of the switched mirrors and wide range of switching and or routing of an optical signal can be effected. In addition by the selective placement of components with the optical system polarization effects can be controlled with the optical system to more effectively provide for subsequent signal transmission.

16 Claims, 13 Drawing Sheets

U.S. PATENT DOCUMENTS

| | | | |
|---|---|---|---|
| 5,692,077 A | 11/1997 | Stone et al. | 385/16 |
| 5,706,383 A | 1/1998 | Malcutt et al. | 385/131 |
| 5,761,351 A | 6/1998 | Johnson | 359/128 |
| 5,771,320 A | 6/1998 | Stone | 385/16 |
| 5,799,231 A * | 8/1998 | Gates et al. | 349/115 |
| 5,892,864 A | 4/1999 | Stoll et al. | 385/14 |
| 5,982,515 A | 11/1999 | Stone et al. | 359/111 |
| 6,072,923 A | 6/2000 | Stone | 385/16 |

OTHER PUBLICATIONS

W. Ng, A.A. Walston, G. L. Tangonan, J. J. Lee, I. L. Newberg, and N. Bernstein, "The First Demonstration of an Optically Steered Microwave Phased Array Antenna Using True–Time–Delay," Journal of Lightwave Technology, 9, 1124 (1991).

E. Ackerman, S. Wanuga, D. Kasemset, W. Minford, N. Thorsten, and J. Watson, "Integrated 6–bit Photonic True–Time–Delay Unit for Lightweight 3–6 GHz Radar Beamformer," IEEE MTT–S Microwave Symposium Digest, 681 (1992).

C. T. Sullivan, S. D. Mukherjee, M. K. Hibbs–Brenner, A. Gopinath, E. Kalweit, T. Marta, W. Goldberg, and R. Walterson, "Switched Time Delay Elements Based on AlGaAs/ GaAs Optical Waveguide Technology at 1.32_m for Optically Controlled Phased Array Antennas," Proceedings of the SPIE, 1703, 264 (1992).

M. Wickham, L. Dozal, L. Lembo, and J. Brock, "A Fiber–Optic Bragg Grating True–Time Delay Generator for Broadband RF Applications," Proceedings of the SPIE, 2560, 148 (Feb., 1995).

★ L. Xu, R. Taylor, and S.R. Forrest, "True Time–Delay Phased–Array Antenna Feed System Based on Optical Heterodyne Techniques," IEEE Photonics Technology Letters, 8, 160 (Jan. 1996).★ .

E. N. Toughlian and H. Zmuda, "A Photonic Variable RF Delay Line for Phased Array Antennas," Journal of Lightwave Technology, 8, 1824 (1990).

J. H. Hong and I. McMichael, "Novel Optical Technique for Phased–Array Processing, " Optical Engineering, 30, 1976 (1991).

L.H. Gesell and T. M. Turpin, "True Time DelayBeam Forming Using Acousto–optics," Proceedings of the SPIE, 1703, 592 (1992).

N.A. Riza, "High Speed Two Dimensional Phased Array Antenna Scanning Using Acousto–Optics," Proceedings of the SPIE, 1703, 460 (1992).

E. Spitz, D. Dolfi, and J–P Huignard, Microwave Beam Forming by Optical Delay Switching, proceeding of the SPIE, 1807, 422 (1992).

E. N. Toughlian and H. Zmuda, "Variable Time–Delay System for Broadband Phased Array and Other Transversal Filtering Applications," Optical Engineering, 32, 613 (1993).

W. D. Jemison and P. R. Herczfeld, "Acoustooptically Controlled True Time Delays," IEEE Microwave and Guided Wave Letters, 3, 72 (1993).

N.A. Riza, "Polarization–Based Fiber–Optic Delay Lines," Proceedings of the SPIE, 2560, 120 (Feb. 1995).

D. Dolfi, "Photonics for Phased Array Radars," Proceedings of the SPIE, 2560, 158 (Feb. 1995).

R. T. Ingwall and T. Adams, "Hologram:Liquid Crystal Comopsites," Proceedings of the SPIE 1555, 279–290 (1991).

Y–T Huang, "Polarization Selective Volume Holograms," Applied Optics, 33, 2115 (1994).

Y–T Huang "Polarization—independent Optical switch Composed of Holographic Optical Elements," Optics Letters, vol. 20, No. 1, 1198–1200 (May 15, 1995).

L.B. Aronson, L. Hesselink, "Analysis And Demonstration Of An Integrated Optical Switch Based On Dynamic Free Carrier Gratings: A Blueprint For A 100 x 100 Element Switch Array," IEEE Journal Of Quantum Electronics 30, 2332 (1994).

T.J. Bunning, L. V. Natarajan, V. P. Tondiglia, R.L. Sutherland, D. L. Vezie, and W. W. Adams, "Morphology of Reflection Holograms Formed In SituUsing Polymer–Dispersed Liquid Crystals," Polymer [Polymer Communications] 37, 3147(1996).

T. J. Cloonan, "Free–Space Optical Implementation of a Feed–Forward Crossbar Network," Applied Optics 29, 2006, see Fig. 10 in particular, (1990).

M. S. Malcuit and T.W. Stone, "Optically Switched Volume Holographic Elements, " Optics Letters, 20, 1328 (Jun. 1, 1995)★ .

T. Stone, M. Malcuit, and J. Kleinfeld, "Switched Grating Devices For Phased Array Applications," Proceedings of the SPIE, 2844, 182 (1996)★ .

T. Stone, M. Malcuit, and J. Kleinfeld, and J. Kralik, "Micro–Optic Photonic Time Shifters Based On Switched Gratings, " Proceedings of the SPIE, 3160, 17 (1997). ★ .

T. Stone, J. Kralik, and M. Malcuit, "Characteristics of Photonic Time Shifters Based on Switched Gratings, " Proceedings of the SPIE, 3463, (Jul. 21–22, 1998). ★ .

R. L. Sutherland, L.V. Natarajan, V.P. Tondiglia, T.J. Bunning, and W. W. Adams "Switchable Holograms in New Photopolymer–Liquid Crystal Composite Materials, " Proceedings of the SPIE, 2404, 132 (Mar. 1995).

H. Okayama, M. Kawahara, "Experiment On Deflector–selector Optical Switch Matrix," Electronic Letters 28, 638 (1992).

J. M. Heaton, D.R. Wight, J. T. Parker, B. T. Hughes, J. C. H. Birbeck, K. P. Hilton, "A Phased Array Optical Scanning (PHAROS) Device Used As A 1–to–9 Way Switch," IEEE Journal of Quantum Electronics 28, 678 (1992).

H. Okayama, M. Kawahara, "Ti: $LiNbo_3$Digital Optical Switch Matrices," Electronics Letters 29, 765 (1993).

T. Kirigara, M. Ogawa, H. Inoue, H. Kodera, K. Ishida, "Lossless And Low–crosstalk Characteristics In An InP–Based 4 x 4 Optical Switch With Integrated Single- –stage Optical Amplifiers, " IEEE Photonics Technology Letters 6, 218 (1994).

N. Keil, H. H. Yao, C. Zawadzki, "Polymer Waveguide Optical Switch With <—40dB Polarization Independent Crosstalk," Electronics Letters 32, 655 (Mar. 28, 1996)*.

P. C. Huang, W. E. Stephens, T. C. Banwell, L. A. Reith, "Performance of 4 x 4 Optical Crossbar Switch Utilizing Acousto–Optic Deflector," Electronics Letters 25, 252, see first Figure in particular, (1989).

A. Chiou, P. Yeh, "Energy Efficiency of Optical Interconnections Using Photorefractive Holograms," Applied Optics 29, 1111 (1990).

D. O. Harris, A. Vanderlugt, "Multichannel Acousto–optic Crossbar Switch With Arbitrary Signal Fan–out," Applied Optics 31, 1684, see Figure 1 in particular, (1992).

M. Kato, H. Ito, T. Yamamoto F. Yamagishi, and T. Nakagami, "Multichannel Optical Switch That Uses Holograms," Optics Letters 17, 769, see Figure 1 in particular, (1992).

H. Yamazaki, M. Yamaguchi, "Experiments On A Multichannel Holographic Optical Switch With The Use Of A Liquid–Crystal Display," Optics Letters 17, 1228, see Figure 1 in particular, (1992).

M. Fukui, K. Kitayama, "High–throughput Optical Image Crossbar Switch That Uses A Point Light Source Array," Optics Letters 18, 376 (1993).

Z. Pan, M. Dagenais, "Subnanosecond Optically Addressable Generalized Optical Crossbar Switch With An Aggregate Throuput Rate of 4.2 Gbit/s," Appl. Phys. Lett. 62, 2185 (1993).

Y. Wu, L. Liu, Z. Wang, "Optical Crossbar Elements Used For Switching Networks," Applied Optics 33, 175 (1994).

K. Hirabayashi, T. Yamamoto, M. Yamaguchi, "Free–space Optical Interconnections With Liquid–crystal Microprism Arrays," Applied Optics 34, 2571 (May 10, 1995).

T. Sakano, K. Kimura, K. Noguchi, N. Naito, "256 x 256 Turnover–type Free–space Multichannel Optical Switch Based On Polarization Control Using Liquid–crystal Spatial Light Modulators," Applied Optics 34, 2581 (May 10, 1995)*.

G. G. Yang, S. E. Broomfield, "Programmable Wavefront Generation Using Two Binary Phase Spatial Light Modulators," Optics Communications 124, 345 (Mar. 1, 1996)*.

C. P. Barrett, P. Blair, G. S. Buller, D. T. Neilson, B. Robertson, E.C. Smith, M. R. Taghizadeh, A. C. Walker, "Components For The Implementation Of Free–space Optical Crossbars," Applied Optics 35, 6934 (Dec. 10, 1996).*

S. Reinhorn, Y. Amitai, A. A. Friesem, A. W. Lohmann, S. Gorodeisky, "Compact Optical Crossbar Switch," Applied Optics 36, 1039 (Feb. 10, 1997).*

* cited by examiner

OPTICAL SYSTEMS USING SWITCHED MIRRORS

CROSS REFERENCE TO RELATED APPLICATIONS

This application is a continuation-in-part of U.S. application Ser. No. 09/102,700 filed Jun. 22, 1998 now U.S. Pat. No. 6,072,923, SWITCHING, ROUTING, AND TIME DELAY SYSTEMS USING SWITCHED MIRRORS which is in turn a continuation-in-part of U.S. application Ser. No. 08/734,139 filed Oct. 21, 1996 entitled OPTICAL SWITCHING AND ROUTING SYSTEM now U.S. Pat. No. 5,771,320 which is in turn a continuation-in-part of U.S. application Ser. No. 08/640,187 filed Apr. 30, 1996 entitled OPTICAL TIME SHIFTER AND ROUTING SYSTEM now U.S. Pat. No. 5,692,077 and U.S. application Ser. No. 08/641,195 filed Apr. 30, 1996 entitled ACTIVE NOISE SUPPRESSOR FOR MULTICHANNEL OPTICAL SYSTEMS now U.S. Pat. No. 5,706,383. All of the above being incorporated herein by reference.

STATEMENT OF GOVERNMENT INTEREST

This invention was made with U.S. Government support from the U.S. Air Force under Contract No. F30602-98-C-0079. The U.S. Government has certain rights in the invention.

BACKGROUND OF THE INVENTION

This invention relates generally to optical systems, and more particularly, to optical switching and routing systems which incorporate controllable, switchable mirrors therein.

With the advent of substantial new uses for high bandwidth digital and analog electro-optic systems, there exists a greater need to effectively control the route of electro-optic or optical signals from among many possible paths. This is especially true in digital computing systems where signals must be routed among processors, in analog systems such as phased array radar, and in the switching of high bandwidth optical carriers in communication systems. However, it should be realized that these are just several of numerous electro-optic systems which require the use of an optical switching or routing mechanism.

In many current and future systems light beams are modulated in a digital and/or analog fashion and are used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels. Finally, operations that are difficult to perform in the lower (e.g., radio) frequencies such as time shifting for phased array applications can often be performed more efficiently and compactly using optical carriers.

A common problem encountered in applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then re-modulate the optical carrier in the desired channel. However from noise, space, and cost perspectives it is more desirable to directly switch the route of the optical carrier from the input channel to the desired channel.

Another common problem arises in applications where there is a need to arbitrarily interconnect any of n electronic input channels to any of n output channels. This "crossbar switch" type of function is difficult to implement electronically. In such a case better performance may be obtained by modulating the electronic information on optical carriers, and switching the optical carriers to the desired channel where they may be reconverted to electronic information if desired.

Still another problem that is typical in switching systems is the insertion loss they impose. Some switching systems divide the input signal power into many parts, and block (absorb) the ones that are not desired. Others use switches that are inefficient and absorb or divert a significant part of the input signal.

It is therefore an object of this invention to provide an optical system that can independently route the optical carriers from an array of input channels to selected members of an array of output channels.

It is another object of this invention to provide an optical system that can independently route the optical carriers from an array of input channels to selected members of an array of output channels including the capability to switch one input channel to more than one output channel if desired.

It is also an object of this invention to provide an optical system that provides for a reduced complexity in terms of number of required optical switching elements and control points when compared with many other optical switches.

It is a further object of this invention to provide an optical system that relies upon a series of uniquely designed switching components.

It is a further object of this invention to provide an optical system that uses switchable mirrors to route or switch multiple wavelength optical signals, such as wavelength division multiplexed digital telecommunication signals, to selected output locations.

It is a still further object of this invention to provide optical systems that provide variable optical attenuation of input optical signals.

It is a further object of this invention to provide optical systems that provide polarization independent switching and attenuation of optical signals.

It is an even further object of this invention to provide optical systems that can selectively polarize an input unpolarized optical beam or signal under electronic control.

SUMMARY OF THE INVENTION

The objects set forth above as well as further and other objects and advantages of the present invention are achieved by the embodiments of the invention described hereinbelow.

More specifically, the present invention overcomes problems associated with sensitivity to the wavelength of the optical carriers, insertion loss, number of required switching devices and control signals, switch isolation, noise and crosstalk suppression, spurious reflections, data skew, and compactness that are present in other optical switching, routing, interconnection, and time delay systems. The present invention includes devices that use high efficiency switched mirrors to form optical switching, interconnection, routing, variable optical attenuation, polarizing systems, and time delay networks.

Furthermore, the switched mirrors can function, for example, by diffraction (diffractive mirrors) or reflection (reflective mirrors) and have the benefits of a lack of dispersion, where the steered direction does not strongly depend on wavelength. This added benefit can be an asset in very high bandwidth and wavelength multiplexed systems.

In addition, the present invention overcomes difficulties in obtaining uniform system performance on input optical signals or signal components that are orthogonally polarized.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

It should be noted that the terms switched mirrors and switchable mirrors are used interchangeably throughout the application. In addition, the generic term electromagnetic radiation is used to cover all types of optical signals including, but not limited to, light, beams and channels.

The switching, routing, and time delay systems of this invention utilize switchable mirrors to steer light from input optical channels to various output spatial locations or output optical channels, or alternatively, from an input channel to among a variety of optical paths with differing path lengths or time delays.

Figure 1:
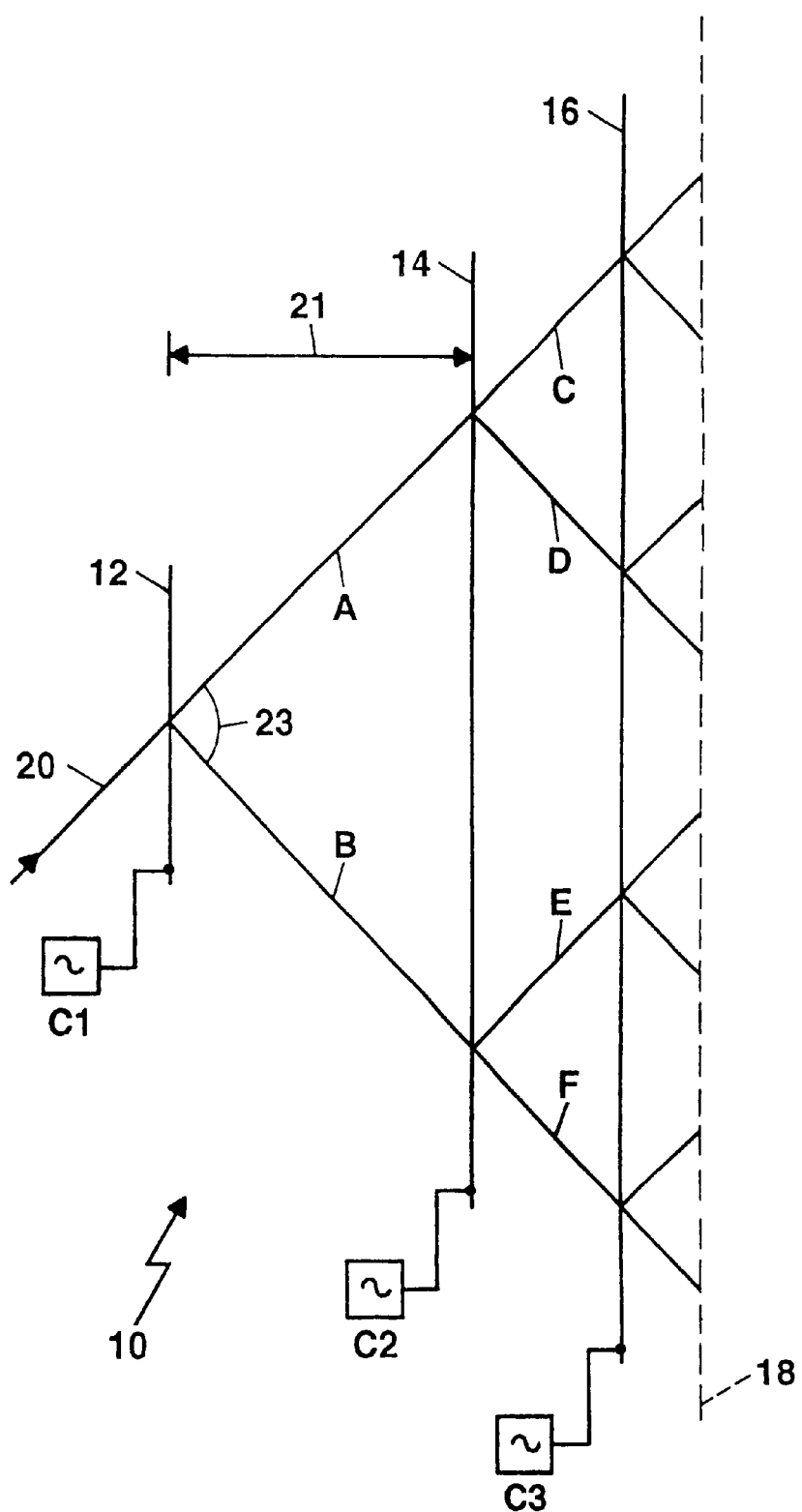
FIG. 1 is a schematic representation of a canonical router system of this invention incorporating electrically switchable mirrors therein.

Reference is now made to FIG. 1 of the drawings which illustrates the broad concept of a fundamental form of the invention in schematic fashion, thereby presenting a building block of the optical time shifter, routing, and switching systems of the present invention in one of numerous embodiments, the other embodiments being set forth below with respect to the remaining figures.

One embodiment of the subject invention is the routing system 10 illustrated in FIG. 1 of the drawings which depicts a plurality (three being illustrated therein) of switchable mirrors (or switchable mirror arrays, used interchangeably here) 12, 14, 16 which are controlled by any suitable control signals C1–C3 and shown in a cascading fashion. The switchable mirrors (or mirror-arrays) 12, 14 and 16 are systematically and some of the possible structures for these mirrors are described hereinbelow. This embodiment enables a beam of electromagnetic radiation, preferably in the form of an optical input carrier 20 to follow 8 possible optical paths leading to 8 differing spatial locations or output channels shown in ouput plane 18. All of these paths being configured in free-space, without external limitations, although it should be realized the system can be encompassed in a medium of dielectric constant other than unity. In other words, glass or other transparent slabs may be used to separate the planes of switched mirrors to provide for a monolithic and stable device that is not easily misaligned. Thus, "free space" in the context of this invention describes the use of freely propagating electromagnetic waves in comparison to "guided wave" systems in which the optical carriers are confined to waveguides which are typically of fiber or planar form. In related embodiments of the present invention, each optical path can add a preselected increment in time delay to a transmitted signal.

By selecting one of the 8 combinations of "on or off" states in the mirrors 12, 14, and 16, an input optical carrier signal 20 emanating from any suitable source of electromagnetic radiation (not shown) is reflected (or diffracted as in the case of a holographic mirror) to follow one of the series of paths as shown in FIG. 1. For example, the beam of electromagnetic radiation (or optical carrier) 20 follows either path A or B after passing through mirror 14 follows preselected paths C, D, E, or F. Thereafter further different optical paths may be followed as illustrated in FIG. 1.

Important parameters of the router shown in FIG. 1 include the state separation 21 and deviation angle 23. The mirrors, which may take the form of holographic elements described below, have a distinct tradeoff relating to the Bragg regime of their operation. Parameters such as thickness and spatial period must be balanced to assure high diffraction efficiency but also to retain maximal angular and spectral bandwidth tolerances. Finally, the use of micro-optics enables very compact routing, switching, and density and diffractive crosstalk effects as will be pointed out hereinbelow. As the number of stages are increased, their separation increases in multiples so it is usually advantageous to keep spacing small, thus keeping the overall shifter compact.

The switchable mirrors used in the present invention can be made using many technologies, such as volume holographic mirrors, multilayer mirrors, deformable mirrors and micro electro-mechanical mirrors. But the common feature is that the mirrors exhibit a reflectance that is variable and controllable. When in an "off" state, the mirrors are transparent (or, alternatively, tilted, or displaced out of the path of the incident beam). When in an "on" state, the mirrors are reflective (or, alternatively, displaced into the path of the incident beam). Many technologies, as described below, also allow for intermediate reflectance values which allow for "fanning-out" the incident signal to among more than one of the delay paths or output channels.

Figure 2:
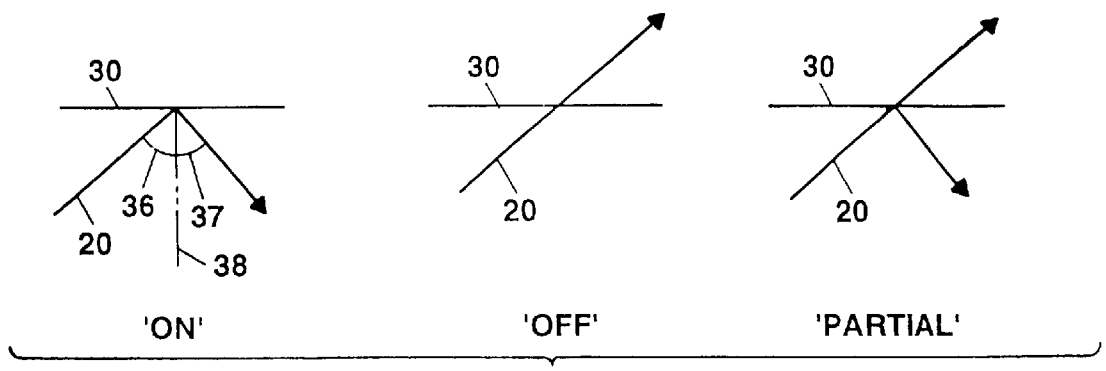
FIG. 2 is a schematic representation of one configuration of switchable mirrors useful in this invention.
Figure 3:
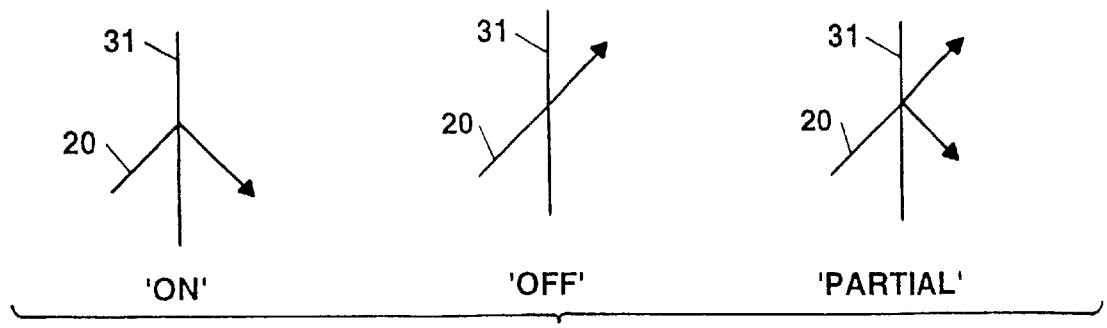
FIG. 3 is a schematic representation of a second configuration of switchable mirrors useful in this invention.
Figure 4:
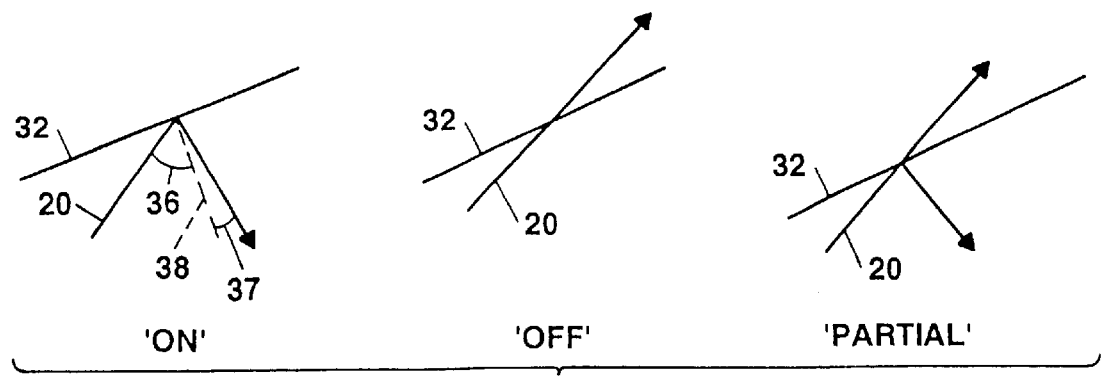
FIG. 4 is a schematic representation of a third configuration of switchable mirrors useful in this invention.

Reference is now made to FIGS. 2–4 of the drawings which illustrate three possible configurations of switchable mirrors. For each of the switchable mirror configurations and optical carrier 20 is incident on the switched mirror structure for the cases of the mirrors off, on, and at an intermediate value of reflectance. In FIG. 2, the optical carrier 20 is incident on switched mirror 30 and is reflected from the mirror that is "on" transmitted through the mirror that is "off", and split into both reflected and transmitted beams by the intermediate state mirror. Switchable mirror 30 is the usual geometry for a mirror, in which incident and reflected waves make equal angles, 36 and 37, with respect to the surface normal, 38.

In FIG. 3 the switchable mirror 31 is shown in a transmission configuration. This reflecting structure can be built, for example, with arrayed conventional switched mirrors, by arrays of deflectable or deformable mirrors, or holographically.

In FIG. 4 the switchable mirror 32 is shown in an asymmetric reflecting configuration, in which incident and reflected waves make unequal angles, 36 and 37, with respect to the surface normal, 38. This reflecting structure can be fabricated, for example, using standard holographic techniques. In such a process, two plane waves incident on opposite sides of the volume recording material, and at asymmetric angles, interfere and produce a spatial refractive index variation throughout the volume of the recording material.

A significant benefit of using the switched mirror elements described here in place of switched transmission gratings is that there is little or no angular dispersion of the optical channel or beam when steered with these mirror elements. Thus multiple wavelengths or broad-spectrum light can be routed, delayed, interconnected, or switched with little or not dispersive angular deviation of the optical carrier.

In one of the preferred embodiments of the invention, volume phase holographic switchable mirrors are used to permit switching of the incident energy between the transmitted and reflected directions. Such switchable mirrors may be controlled by electrical switching, optical switching, and polarization switching of the mirrors, as discussed with specific embodiments of the invention. Recently it has been demonstrated that high efficiency volume diffraction gratings which are recorded in permeable media, such as the DMP-128 photopolymer manufactured by Polaroid Corporation, Cambridge, Massachusetts can be made to be rapidly switchable between high and low diffraction efficiency states under electric control by imbibing the structure with liquid crystals. In this technique, the crystals are rotated by the applied electric field and their refractive index switches in the range between ordinary and extraordinary values. By choosing the materials so that one of these switchable values of refractive index matches that of the phase modulation in the grating, the grating modulation is effectively switched "off-and-on" as the liquid crystal "fill" material index matches and mismatches the modulation, respectively.

Most of the optical time shifter and routing systems described herein can utilize electrically switched gratings. In this approach the volume phase diffraction grating, which is typically on the order of tens of microns thick, is bounded by transparent conducting electrodes.

Referring once again to FIG. 1, it should be further understood that although three such gratings are illustrated in the figure, the number of grating can vary in accordance with the utilization of this invention. For example, with the diffraction efficiency of all three gratings off, the shortest, straight through path (that is, following along optical path A, C, etc.) is selected. If the first grating 12 is "on" and all others "off," the top path is selected following optical path B, F, etc. Consequently, by a combination of "on"-"off" signals applied to the gratings, it is possible in free space to not only route the optical signal to a desired output area, but also (shown in later time-delay configurations) to do so with a predetermined time delay.

Figure 5:
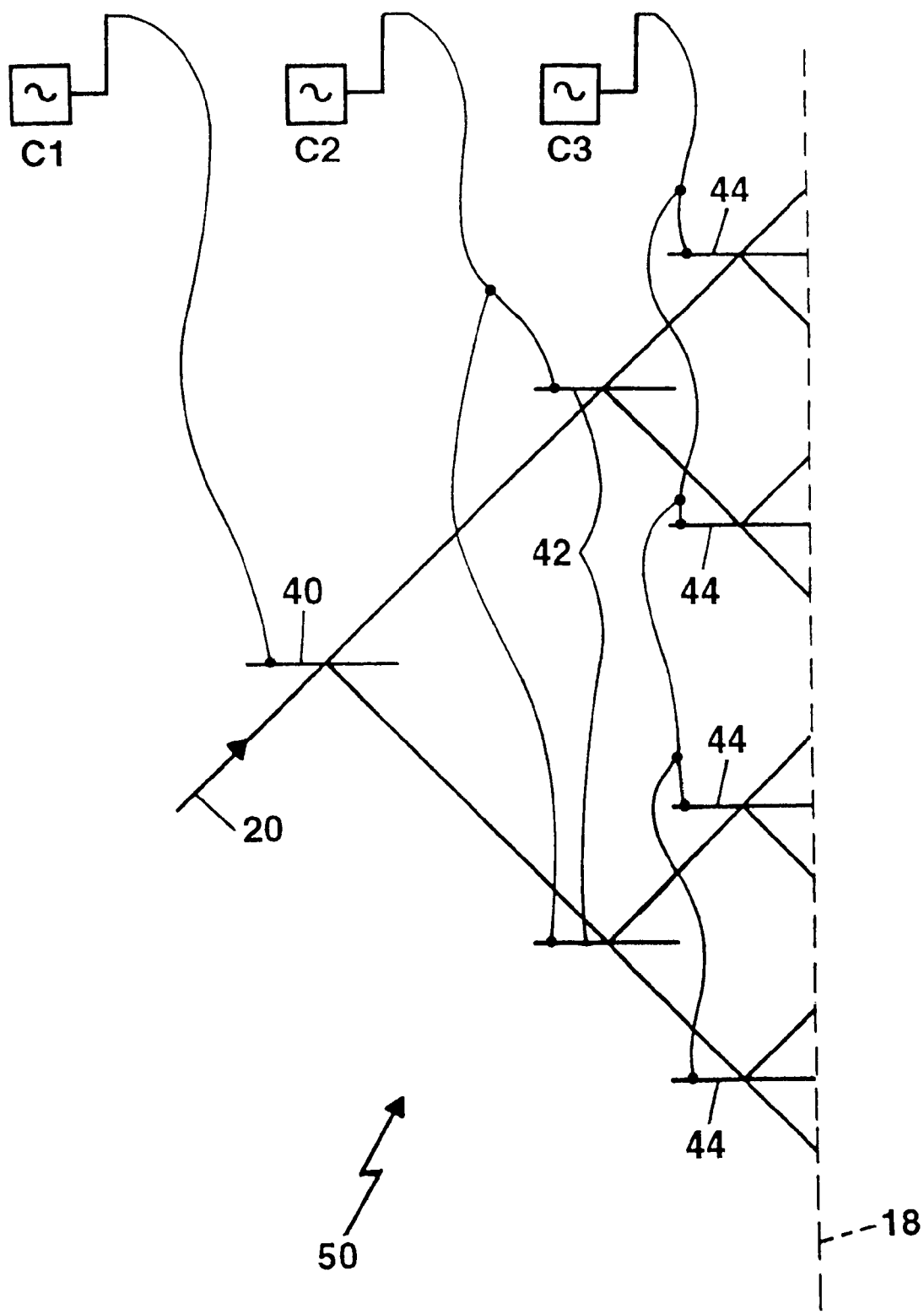
FIG. 5 is a schematic representation of a second canonical router system of this invention incorporating electrically switchable mirrors therein.

Reference is now made to FIG. 5 of the drawings which illustrates another embodiment of the invention in schematic fashion, thereby presenting another building block of the optical time shifter, routing, and switching systems of the present invention.

In this embodiment of the subject invention the routing system 50 illustrated in FIG. 5 of the drawings includes a plurality of switchable mirrors in three groups, 40, 42, 44 which are controlled by any suitable control signals $C_1$–$C_3$ and shown in a cascading fashion. The switchable mirrors 40, 42, and 44 are shown schematically and may consist of volume holographic switchable mirrors. This embodiment enables a beam of electromagnetic radiation, preferably in the form of an optical input carrier 20 to follow 8 possible optical paths leading to 8 differing spatial locations or output channels shown in output plane 18. All of these paths being configured in free-space, without external limitations, although it should be realized the system can be encompassed in a medium of dielectric constant other than unity.

Each of the mirrors grouped at a given cascade depth, e.g., group 40, 42, or 44, may be switched in common. Accordingly, all 4 gratings 44 can be set "on" or "off" with a single control line. In such a fashion n control lines can route a given optical carrier among any of $2^{**}n$ output channels or different delay paths.

Figure 6:
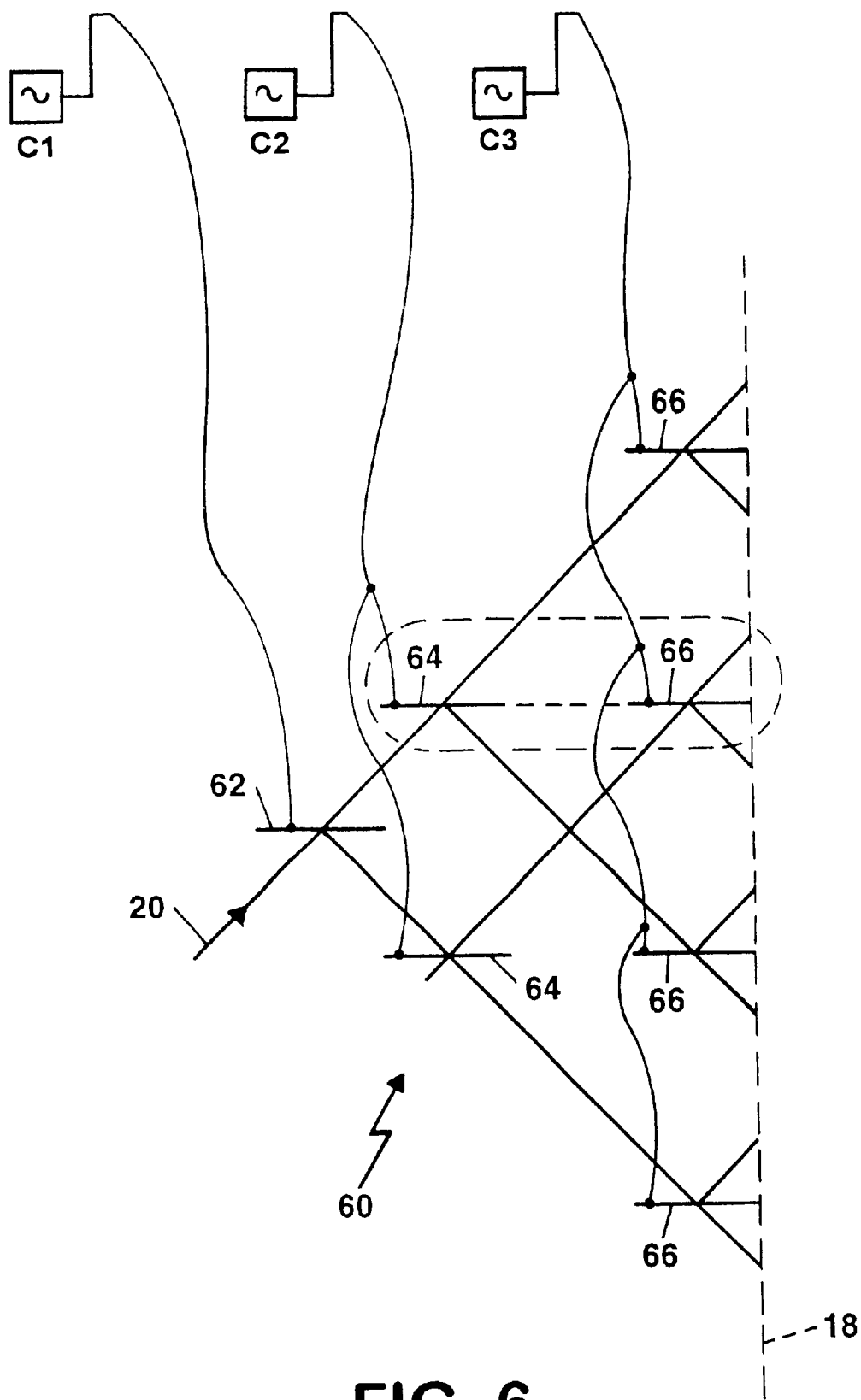
FIG. 6 is a schematic representation of a third canonical router system of this invention incorporating electrically switchable mirrors therein.

Reference is now made to FIG. 6 of the drawings which illustrates another embodiment of the invention in schematic fashion, thereby presenting another building block of the optical time shifter, routing, and switching systems of the present invention.

In this embodiment of the subject invention the routing system 60 illustrated in FIG. 6 of the drawings includes a plurality of switchable mirrors in three groups, 62, 64, 66 which are controlled by any suitable control signals $C_1$–$C_3$ and shown in a cascading fashion. The switchable mirrors 62, 64, 66 are shown schematically and may consist of volume holographic switchable mirrors. This embodiment enables a beam of electromagnetic radiation, preferably in the form of an optical input carrier 20 to follow 8 possible optical paths leading to 8 differing spatial locations or output channels shown in output plane 18. Here the spacing of the three grating groups or stages 62, 64, 66 has been arranged such that the gratings of group 64 line up with two of the gratings in group 66. This allows for a practical simplification since a single switched grating with two pixels (shown in the dashed oval) can be located in place of those two grating elements. In such a configuration, one pixel is switched with group 64 and the other with group 66, as shown in FIG. 6.

Using these principles and the switched mirror elements of FIGS. 2, 3, and 4, the canonical switched mirror router shown in FIGS. 1, 5, and 6 can be applied in a straightforward manner to extend the time delay, routing, interconnection, and switching systems of the three cross-referenced applications cited at the beginning of the present application to the use of switched mirror elements. In so doing, the benefits of wavelength insensitivity and lack of angular dispersion can be imparted to these systems. Further, since the discrete selectable paths are isolated as in these earlier systems, the saturable absorber, active, and passive crosstalk or noise suppressors described in these earlier applications also may be incorporated in the switched mirror systems in a straightforward fashion. To this end, the 4 figures of U.S. Pat. No. 5,771,320 issued Jun. 23, 1998 entitled OPTICAL SWITCHING AND ROUTING SYSTEM and their descriptions are incorporated herein by reference. Similarly, the 16 figures of U.S. Pat. No. 5,692,077 issued Nov. 27, 1997 entitled OPTICAL TIME SHIFTER AND ROUTING SYSTEM and the 5 figures of U.S. Pat. No. 5,706,383 issued Jan. 6, 1998 entitled ACTIVE NOISE SUPPRESSOR FOR MULTICHANEL OPTICAL SYSTEMS and their respective descriptions are also incorporated herein by reference. In each of the above cases, the switched gratings are replaced in this invention with the switched mirrors to form the systems of the present invention.

Figure 7:
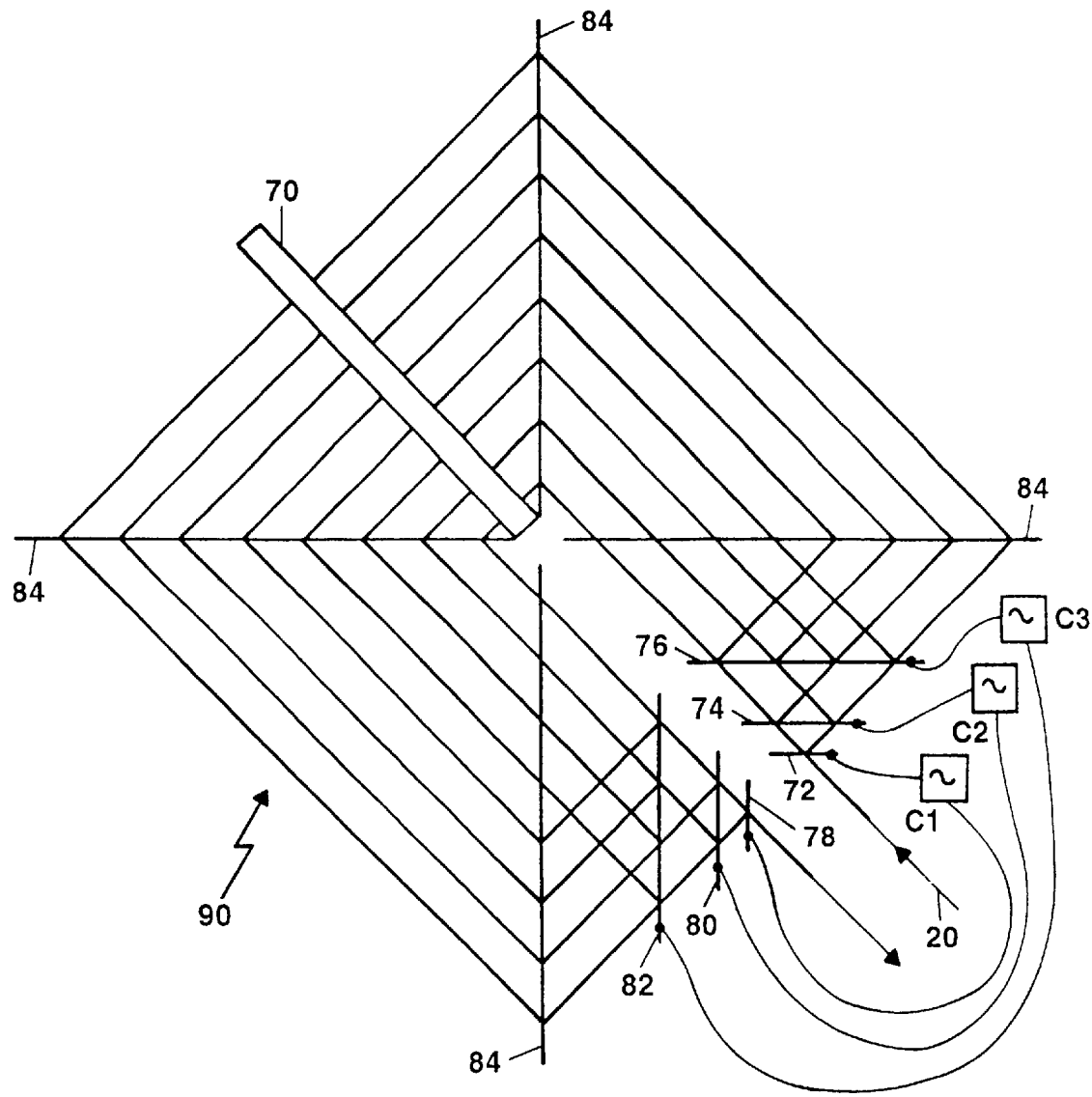
FIG. 7 is a schematic representation of an optical time delay system of this invention incorporating electrically switchable mirrors therein.

An example of this straightforward application of the principles herein is given here in FIG. 7. This time delay system 90 is identical to that of FIG. 15 of U.S. Pat. No. 5,692,077 issued Nov. 25, 1997 entitled OPTICAL TIME SHIFTER AND ROUTING SYSTEM. However, now switched mirrors 72, 74, 76, 78, 80, 82 are used (of the type in FIGS. 1 and 3) in place of switched gratings. The noise suppressor stage 70 is also directly analogous to that of the earlier patented system. The noise suppressor may consist of a pixellated switchable mirror or grating. In such a case, the desired channel is left to pass, and the grating or mirror pixels in the other (non-selected) channels are set on to deflect the crosstalk signals they contain out of the system. The "steering gratings" of the prior inventions can also be replaced by static mirror arrays, or switched mirrors, 84, which can also be segmented or pixellated and used to add further active crosstalk suppression as described above.

Figure 8:
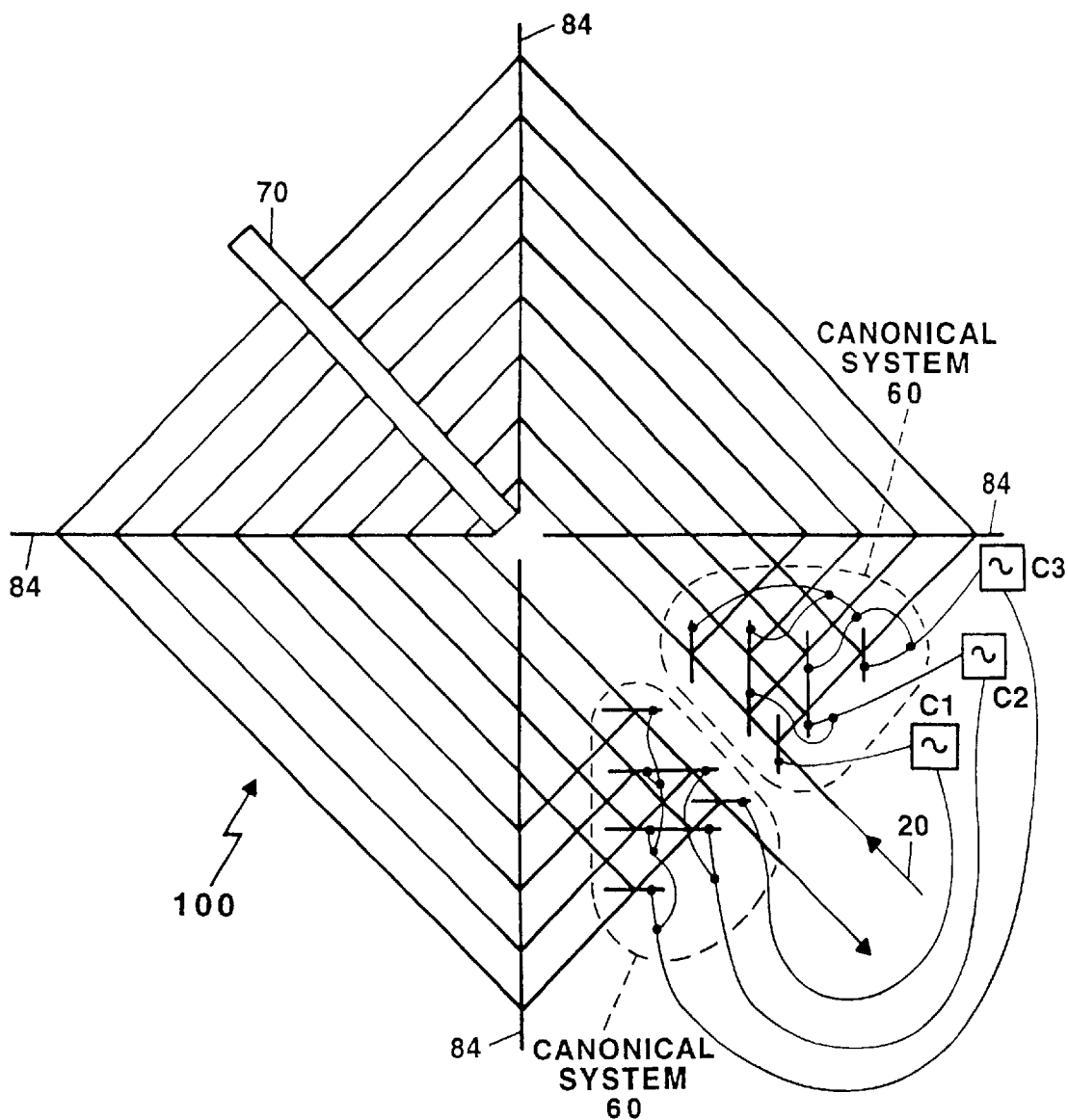
FIG. 8 is a schematic representation of a second optical time delay loop system of this invention incorporating electrically switchable mirrors therein.

In similar fashion, FIG. 8 contains a related system, 100, to that of FIG. 7, but where switched mirrors of the type shown in FIG. 2, and the canonical router of FIGS. 5 or 6 are used. Two of the canonical router systems 60 of FIG. 6 are used in FIG. 8 to effect a switched mirror time delay system.

Figure 9:
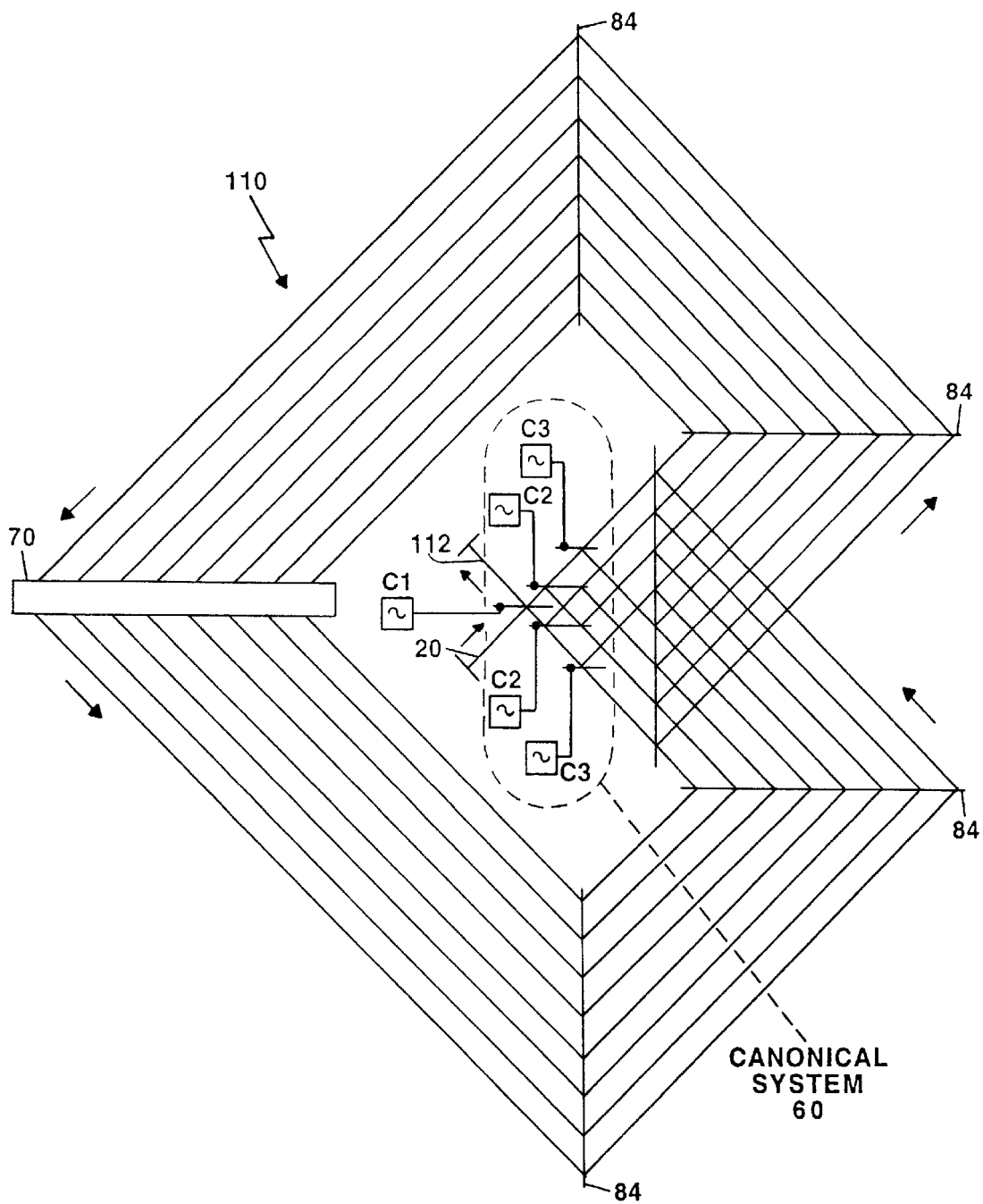
FIG. 9 is a schematic representation of a closed loop optical time delay system of this invention incorporating electrically switchable mirrors therein.

A related "closed loop" time shifter system 110 is illustrated in FIG. 9. Here the same canonical switching system 60 is used in double pass in a closed loop configuration. Setting the n control lines steers the beam through any of the 2**n selectable paths, each with a distinct time delay. The same grating states, on the second pass, steer the optical carrier to the output 112. This configuration is useful with either switched gratings or mirrors.

Two of the preferred embodiments described earlier in FIGS. 5 and 6 make use of switchable holographic multilayer mirrors to electro-optically route or steer the incident light beams. By setting the gratings 40, 42, 44 or 62, 64, 66 of FIGS. 5 and 6 respectively to intermediate values of reflectance (i.e., neither fully reflective or transparent) fanout (fan-out) or multicast functions can be obtained. For example, if each of the switchable gratings is set to a reflectivity of nearly 50%, then the incident light beam is steered equally among all output channels. This implements a full broadcast of the input channel to all output channels. Many switched grating technologies possess a gray-level response that makes these fan-out functions possible. For example, liquid crystal imbibed DMP-128 and holographic polymer dispersed liquid crystal gratings can readily be used in this type of device with fanout and/or broadcast capability.

Figure 10:
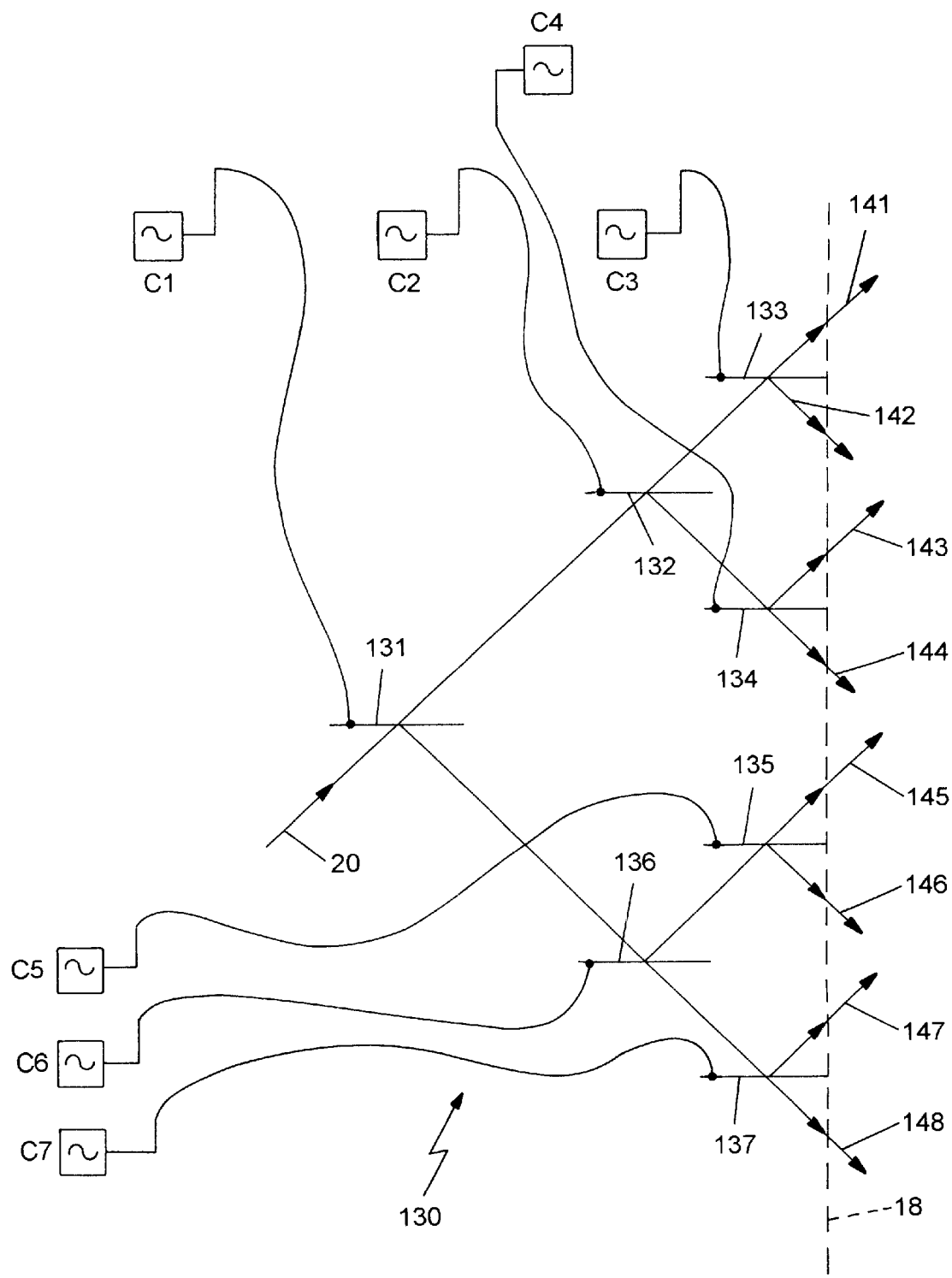
FIG. 10 is a schematic representation of a fourth canonical router system of this invention incorporating electrically switchable mirrors therein.

Reference is now made to FIG. 10. When arbitrary fanout among subsets of output channels is desired (for example, but not limited thereto, from the input to a specific subset of three outputs, but none others), it is necessary to provide individual control of some or all of the individual switchable mirror elements or mirrors. For the most general fanout capability, each of the switchable mirror elements must be individually controllable to a desired efficiency or reflectivity. It should also be noted that individually controllable mirrors may also be considered or referred to as reflecting pixels. FIG. 10 shows a switched mirror router 130 with individually controllable reflecting pixels 131–137 that is capable of arbitrary fanouts. Individual electrical control of the seven switchable reflecting pixels 131–137 is provided by controls C1–C7, respectively.

Operation of optical system 130, for the case of partial fanout, is described in FIG. 10, for example, for equal fanout of input signal 20 among the three output channels 146, 147, and 148. For this case, the reflecting pixels 131 and 135 are driven to full reflectivity, mirror pixel 136 is driven to ⅓ reflectivity, and mirror pixel 137 is driven to ½ reflectivity. A look-up table can be incorporated in the driving control circuitry to store drive voltages required for all required fanout functions.

The individually controlled reflecting pixels 131–137 are arranged in three groups in a binary tree as shown earlier in FIGS. 1, 5, and 6. These groups are typically separated by distances which are factors or multiples of factors of two. The first group or switched mirror or switched mirror array (terms used interchangeably) is made of reflecting pixel 131. The second group is made of reflecting pixels 132 and 136. And the third group is made of reflecting pixels 133, 134, 135, and 137. The resulting system 130 provides for routing or switching among the eight output locations or channels 141–148 as shown. Fewer or greater numbers of cascaded groups may be used to decrease or increase the number of routable output locations (ports) or channels. For example, if only the first and second groups are used, then routing or switching among four output locations is obtained. If an additional group is cascaded, then routing or switching among 16 output channels is provided. In general, cascading n groups of switchable elemtns in this fashion will provide switching among 2**n output locations, ports, or channels.

Figure 11:
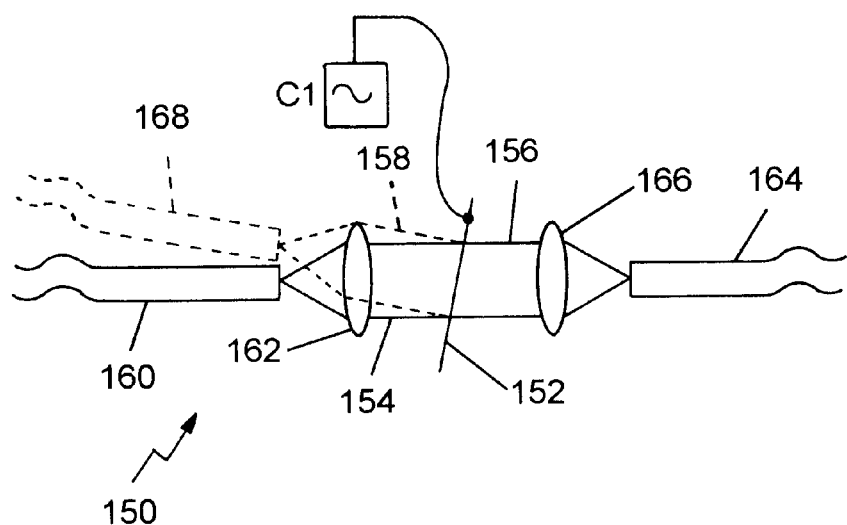
FIG. 11 is a schematic representation of a variable optical attenuator/switching system of this invention incorporating an electrically switchable mirror therein.

Reference is now made to FIG. 11. Here the switchable mirror 152 is used to divert controllable amounts of input beam 154 through reflection into output beam 158. The input beam 154 is equivalently described as an input channel, input optical signal(s), or input port. The transmitted output beam 156 is thereby an attenuated form of input beam 154 due to the amounts of input beam 154 diverted into output beam 158. Similarly the reflected output beam 158 is an attenuated form of input beam 154 according to the amount of input beam 154 that is selectively reflected by switchable mirror 152. The output beams 156 and 158 are equicalently referred to as output signals, output ports, or output channels. The sum of the optical signal powers in outputs 156 and 158 roughly equal the optical input power in input channel 154 minus the usually small optical powers lost to scatter and absorption in the device. This is a versatile system that can be used as a variable optical attenuator or as an optical switch, or both.

For example, first consider the use of system 150 as a variable optical attenuator of input signal 154. Input signal 154 is a free-space input beam that is either directly input or formed by completely or nearly collimating the light (electromagnetic radiation) from input optical fiber or waveguide 160 with lens 162. Switchable grating 152 is driven by driver C1 to a reflectance state that provides the desired transmitted signal intensity level in output signal 156. This output channel 156 may be directly output or coupled into an optical fiber or waveguide 164 using lens 166. For example, for very little attenuation from input 154 to output 156, the switchable mirror is set to low reflectivity by C1 (i.e., is nearly transparent). For increasing values of attenuation, the reflectivity of mirror 152 is increased using C1. Maximum signal attenuation is obtained by setting the reflectivity of switchable mirror 152 to its maximum value (e.g., nearly 100%).

Figure 12:
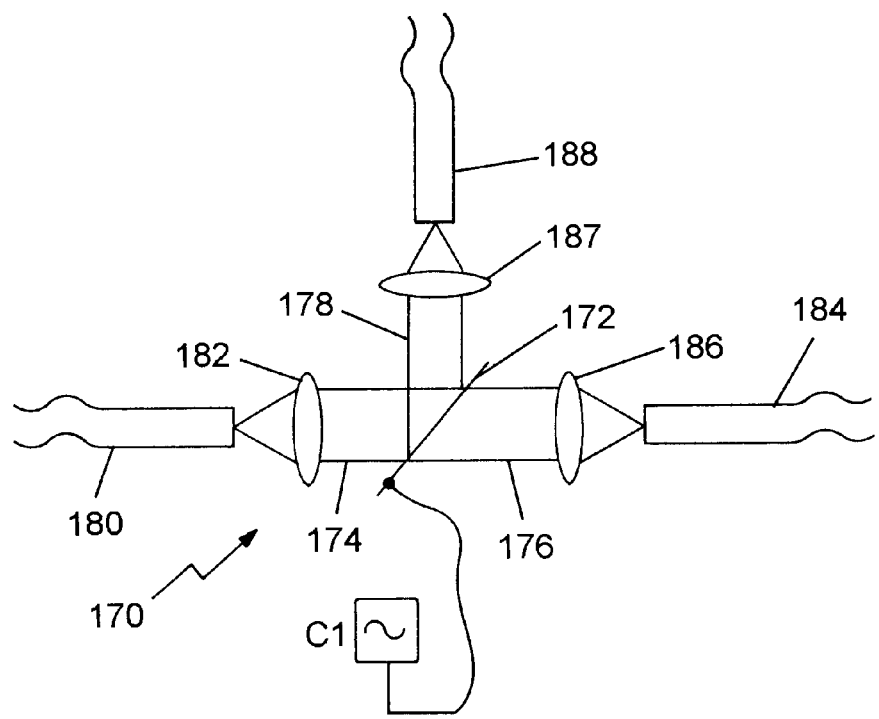
FIG. 12 is a schematic representation of a of a second variable optical attenuator/switching system of this invention incorporating an electrically switchable mirror therein.

The optical system 150 can also be used as a variable optical attenuator in reflection rather than in transmission as above. In this reflective case, reflected signal 158 is used as the output signal, and can either be directly output or coupled into optical fiber or waveguide 168 using lens 162. This is the same lens that was used to form the input beam. Alternatively, another lens can be used for this purpose, as illustrated in FIG. 12.

Finally, optical system 150 can be used as a switch among input channel 154 and two output channels 156 and 158. When used as a switch, the reflectivity can be set to direct nearly all the incident light 154 into channel 156 (reflectivity of 152 near zero); or can be set to direct nearly all the incident light 154 into channel 158 (reflectivity nearly unity); or can be set to fanout the input light 154 among output channels 156 and 158.

In optical system 150 of FIG. 11 the switched mirror 152 reflects light either normal (perpendicular to) the input beam or displaced at a small angle to avoid coupling the reflected light into the input channel if such feedback is undesirable. Larger angular displacements are also useful as shown in FIG. 12. In optical system 170 of FIG. 12, switchable mirror 172 is set at desired values of reflectivity by control C1 as in System 150 to provide variable optical attenuation between input channel 174 and output channel 176 or 178, or alternatively to provide switching between input channel 174 and output channels 176 and 178. Free space input channel 174 may be directly input or formed from optical fiber or waveguide 180 and lens 182. Similarly, the free space output channels 176 and 178, if used, may be directly output or coupled into guided waves in optical fibers or waveguides 184 and 188 respectively using lenses 186 and 187 respectively.

When these systems are used only for optical attenuation rather than switching, the switched mirror components 152 and 172 can be replaced by switchable scatterers or diffusers. With switchable scatterer based variable optical attenuators, the input channels 154 and 174 are typically used with transmitted output channels 156 and 176, respectively.

It is often a requirement (for example in many optical telecommunications applications) that optical switching or variable optical attenuation be accomplished identically without respect to the polarization state of the input optical signal. Yet many of the switchable optical mirror technologies exhibit different characteristics for orthogonal optical input polarization components. When more than one polarization component must be identically switched and/or attenuated (e.g., when using unpolarized input and output channels) a high degree of polarization insensitivity can be obtained using the systems illustrated in FIGS. 13 and 14.

Figure 13A:
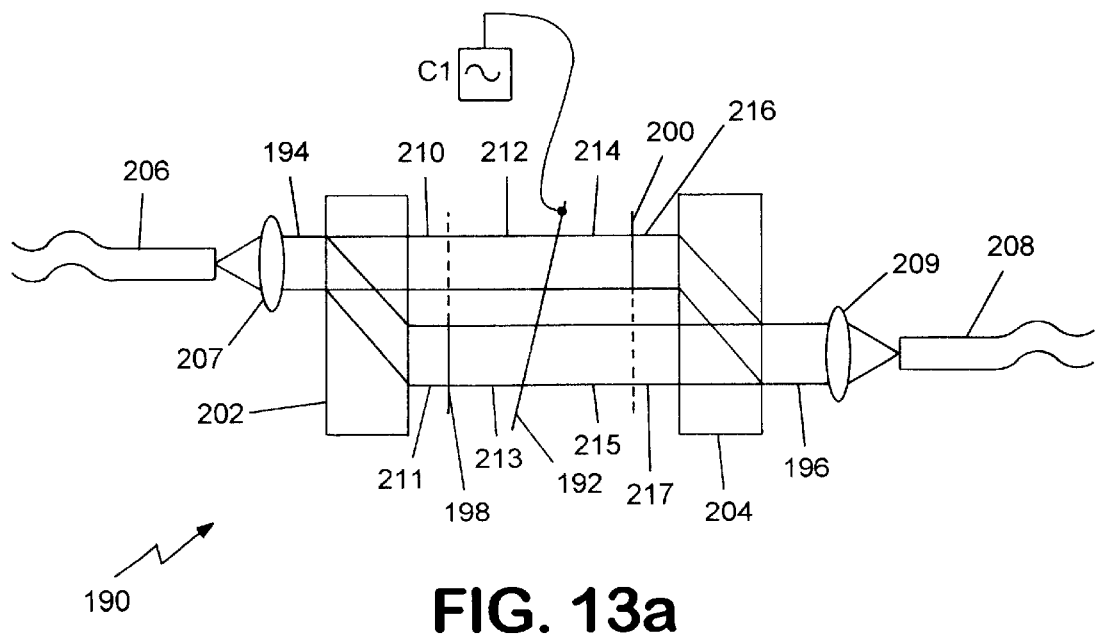
FIG. 13(a) is a schematic representation of a polarization insensitive variable optical attenuator system of this invention incorporating an electrically switchable mirror therein.

An embodiment of this invention that provides for variable optical attenuation that is polarization insensitive is shown in system 190 of FIG. 13a. Free space optical input beam 194 is incident on polarizing beamsplitter 202 that separates the input beam 194 into two 'twin' beams 210 and 211 which are orthogonally polarized. Patterned or pixellated retarder 198 then rotates the polarization of one of the beams relative to the other so that the two resulting beams 212 and 213 then have identical polarization states. These twin beams are then incident on switchable mirror 192 that is controlled by electronic control C1. The transmitted twin beams 214 and 215 are then incident on a second patterned or pixellated retarder 200 that restores the twin beams to orthogonal polarization states resulting in beams 216 and 217. Finally, a second polarizing beam splitter 204 is used to combine the orthogonally polarized twin beams 216 and 217 into a single exiting output beam, channel, or signal 196.

Input signal 194 is a free-space input beam that is either directly input or formed by focusing the light from input optical fiber or waveguide 206 with lens 207. Output signal 196 is a free-space beam that is either directly output or coupled into an output optical fiber or waveguide 208 with lens 209. The polarizing beamsplitters 202 and 205 can be fabricated from birefringent crystals such as calcite, prisms with multilayer coatings, or other usual means in the known in the art. The pixellated retarders 198 and 200 can be fabricated using patterned or discrete birefringent crystals or media. The dashed and solid regions of pixellated retarders 198 and 200 show spatial regions of different pixellation and function. For example, the dashed regions or pixels can be simple blank pixels with no retardance while the solid pixels of pixellated retarders 198 and 200 can be half wave plates that rotate the polarization of incident beams (211 and 214 for the case shown in FIG. 13) by 90 degrees. More simply, the dashed pixels of pixellated retarders 198 and 200 can be eliminated and small retarders used only where the solid lines are shown in pixellated retarders 198 and 200. Finally, several additional variations are possible in the retarders 198 and 200. The orientation of the pixellated retarders 198 and 200 and polarization beamsplitting and combining components 202 and 204 have been shown symmetrically in FIG. 13a so that the optical path length and losses of the twin beams are balanced through the system 190. This can be important to minimize dispersion and time- and phase- delay effects between polarization components in high bandwidth optical signal attenuation and switching applications. The system can also be used with non-symmetric orientation of the patterned waveplates 198 and 200 and polarizing beamsplitters 202 and 204, but it is more difficult to balance the losses and optical path lengths in such configurations.

Optical system 190 can be used as a variable optical attenuator with the advantage of very uniform attenuation of input beam 194 without regard to the state of polarization of input signal or beam 194. All polarization components in input 194 can be equally attenuated in output beam 196. This is especially true since the orthogonal polarization components actually propagate through the device between retarders 198 and 200 as the same polarization. Thus any polarization dependencies in reflectivity of switched mirror 192 have no deleterious effect, since polarization of in the 'twin' beams are temporarily identical. As a further benefit, other small sources of attenuation, in addition to that provided by the switched mirror, are now identical in each of the twin beams.

For example, surface reflection and scattering losses, which are often polarization dependent, will now affect the different polarization components of the incident beam identically. Finally, an added benefit of the polarization insensitive system 190 is that a switched mirror technology can be used (for switchable mirror 192) that is only effective at switching a single polarization component. The polarizing beamsplitters 202 and 204 and retarders 198 and 200 are selected to provide that single polarization state in the region surrounding switched mirror 192.

In optical system 190 as shown in FIG. 13*a*, the attenuated output channels are illustrated as those transmitted through he switchable mirror 192. It is also possible to utilize the reflected beams from the switchable mirror in place of the transmitted beams as shown. This may be advantageous for various switched mirror technologies where, for example, it may be harder to turn the mirrors completely off (transparent) than completely on (reflecting), or visa versa. The use of the reflected twin beams for optical attenuation is analogous to the use of the transmitted beams, and is shown in the system 220 that is described below with respect to FIG. 14 as a polarization insensitive switch.

Figure 13B:
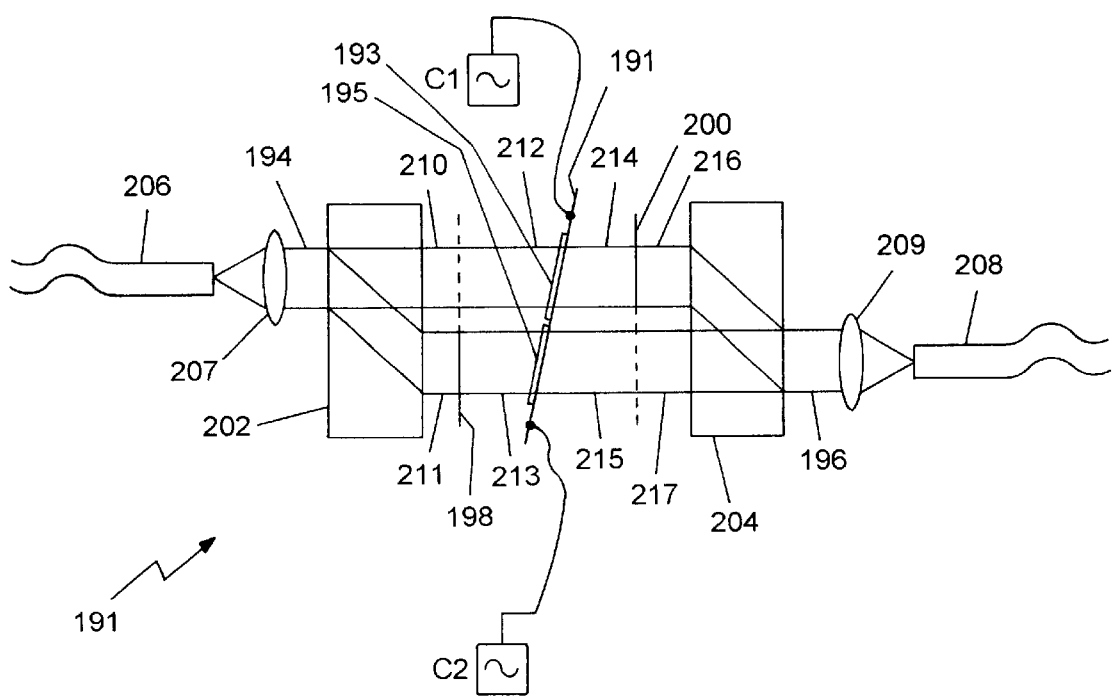
FIG. 13(b) is a schematic representation of a polarizing system of this invention incorporating an electrically switchable mirror therein.

Reference is now made to FIG. 13*b* where optical system 191 is shown that is capable of electronically controlling the polarization of an incident unpolarized optical input signal, beam, or channel. This polarizing optical system 191 is identical to attenuating system 190 except that the switched mirror 192 of system 190 is replaced with switched mirror 191 which has separately controllable reflecting pixels 193 and 195. These separately controllable pixels 193 and 195 are controlled by drivers C1 and C2, respectively. Reflecting pixels 193 and 195 are used to selectively attenuate the orthogonal polarization components of incident signal, beam, or channel 194 prior to recombining these orthogonal components in output beam 196. As the reflectivity of reflecting pixels 193 and/or 195 is increased, a greater attenuation is provided for the respective orthogonal polarization component of incident beam 194. If both reflective pixels 193 and 195 are off, i.e., transparent, the exiting light 196 will be unpolarized. If one reflective pixel is on, i.e., reflective, and the other is off, then the exiting light 196 will be polarized with the polarization of the off pixel. The other orthogonal polarization is available in the reflected beam from the on pixel it desired. In the latter case, this reflected, orthogonally polarized beam, is available using the techniques shown in system 220.

Figure 14:
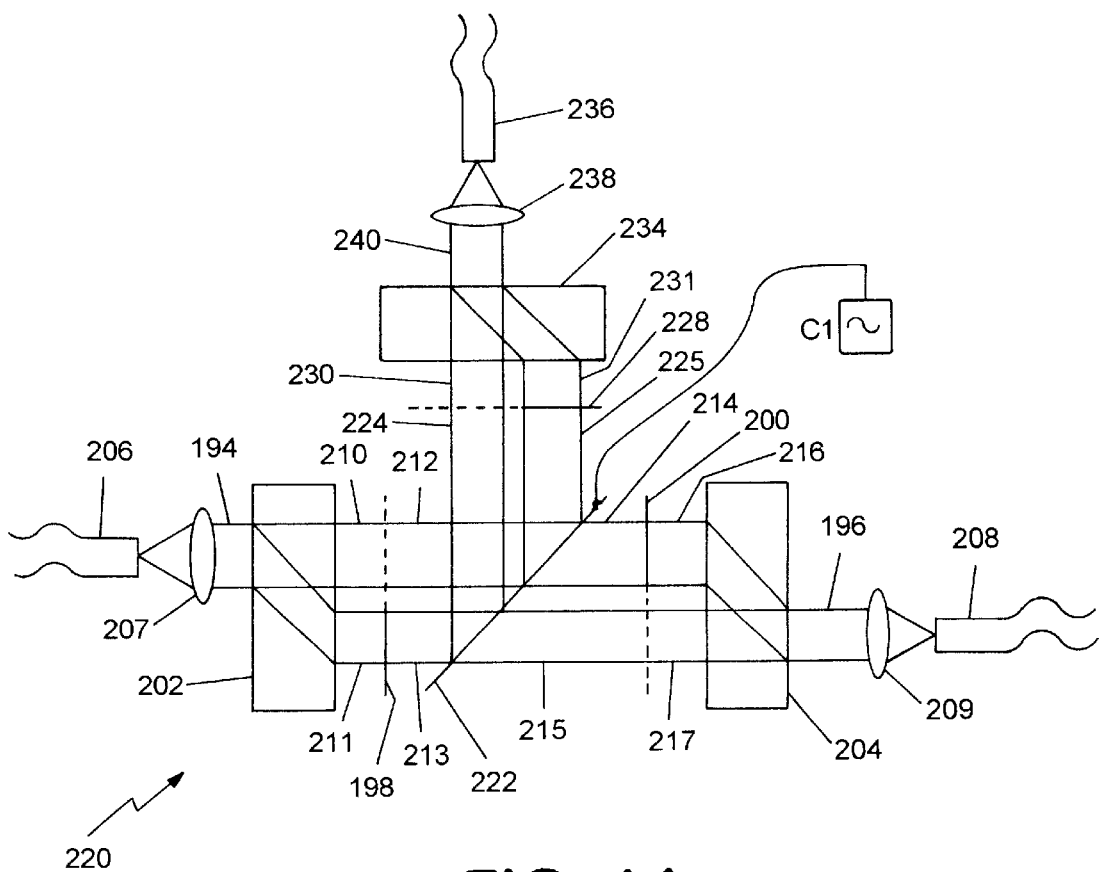
FIG. 14 is a schematic representation of a polarization insensitive variable optical attenuator/switching system of this invention incorporating an electrically switchable mirror therein.

FIG. 14 illustrates an optical switching or routing system 220 that is another variation of the variable optical attenuator system 190 described above. In optical system 220, switchable mirror 222 replaces switchable mirror 192 and provides additionally for twin reflected beams 224 and 225 which are reflected through a large angle allowing them to propagate through patterned waveplate 228 and beam splitter/combiner 234 in the same way as described for transmitted beams 214 and 215 above. These twin reflected beams are combined by polarizing beamsplitter/combiner 234 to form optical output signal, beam, or channel 240. Output beam 240 is a free-space beam that is either directly output or coupled into output optical fiber or waveguide 236 with lens 238. The operation of switchable mirror 222 is controlled by C1 to switch variable amounts of input beam 194 to output beams 196 and 240 which are transmitted and reflected by mirror 222, respectively. Switching and routing optical system 220 is analogous to switching and routing System 170 but is now polarization insensitive with the polarization insensitive advantages described above for system 190.

The devices in this specification can also be used in arrays to switch, attenuate, or polarize many parallel channels. In many of the switched mirror technologies, such as with holographically fabricated switched mirrors, it is relatively easy to fabricate a larger single grating and then pixellate the electrodes when compared with fabricating individual switchable mirror elements on separate substrates and then aligning them. The systems shown in FIGS. 15 and 16 illustrate such array devices that make use of the ability to pixellate individual switchable mirrors.

Figure 15:
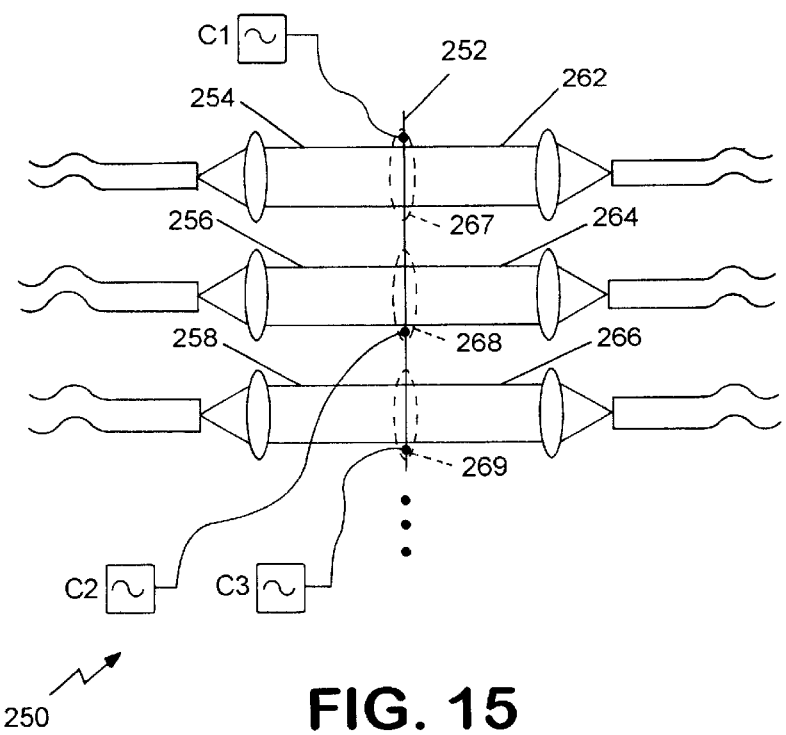
FIG. 15 is a schematic representation of an array of variable optical attenuator systems of this invention incorporating electrically switchable mirrors therein.

Optical system 250 of FIG. 15 shows a pixellated switched mirror or mirror element 252 that includes individually controlled pixels 267, 268, 269 which are controlled by drivers C1, C2, and C3, etc. A plurality of incident beams including 254, 256, and 258, etc., are incident on separate switchable reflective (mirror) pixels. The setting of drivers C1–C3 etc. Provide independent variable optical attenuation from the parallel array of input channels 254, 256, 258 to the respective output channels 262, 264, 266, etc.

Figure 16:
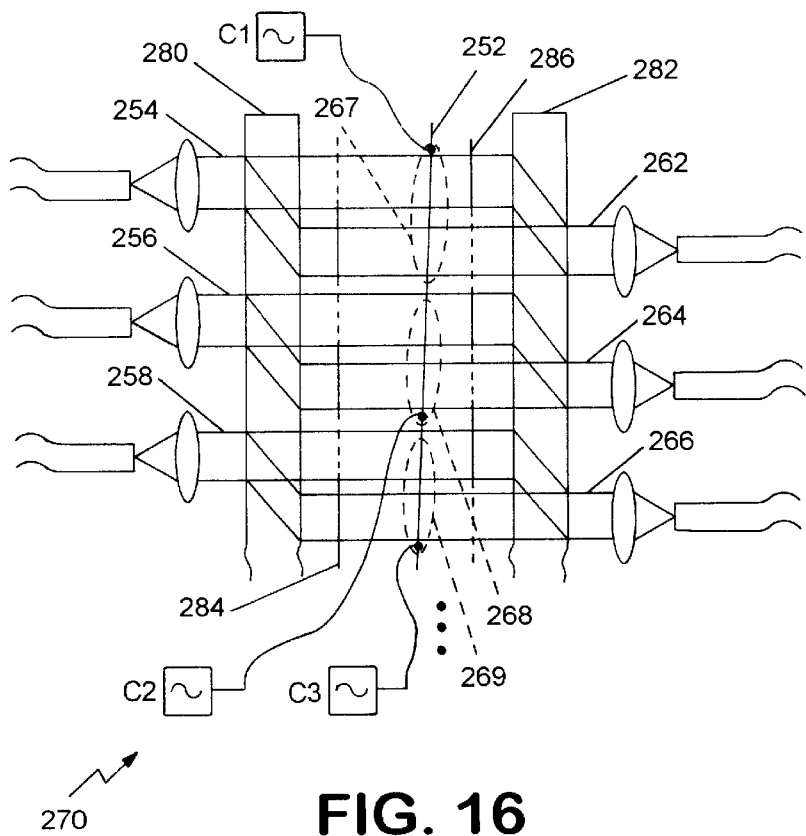
FIG. 16 is a schematic representation of an array of polarization insensitive variable optical attenuator systems of this invention incorporating electrically switchable mirrors therein.

Similarly, system 270 is shown in FIG. 16 and is formed by adding polarizing beamsplitters/combiners 280 and 282, respectively, and pixellated retarders 284 and 286 to system 250. The resulting system 270 provides polarization insensitive variable optical attenuation independently for an array of input channels. In similar fashion, each of the systems covered in this specification can be stacked to form 1-dimensional and in some cases, 2-dimensional arrays of devices with relatively little added overhead.

The technique of a) separating orthogonal polarization components of an incident beam into two spatially separated 'twin' beams, b) modifying the twin beams so they have the same polarization state, c) performing a switching, routing, and/or attenuation operation on the twin beams as if they were a single beam, and d) restoring the twin beams to orthogonal states of polarization, and finally e) combining the orthogonal beam components was used in systems 190 and 220. This procedure results in polarization insensitive performance in the switching, routing, and/or attenuation stages. Further this technique permits polarization independent performance using switched mirror technologies that inherently only function over one polarization state. The same benefit can be obtained in the switched mirror switching and routing systems shown in FIGS. 1 and 5–9 of this specification.

Figure 17:
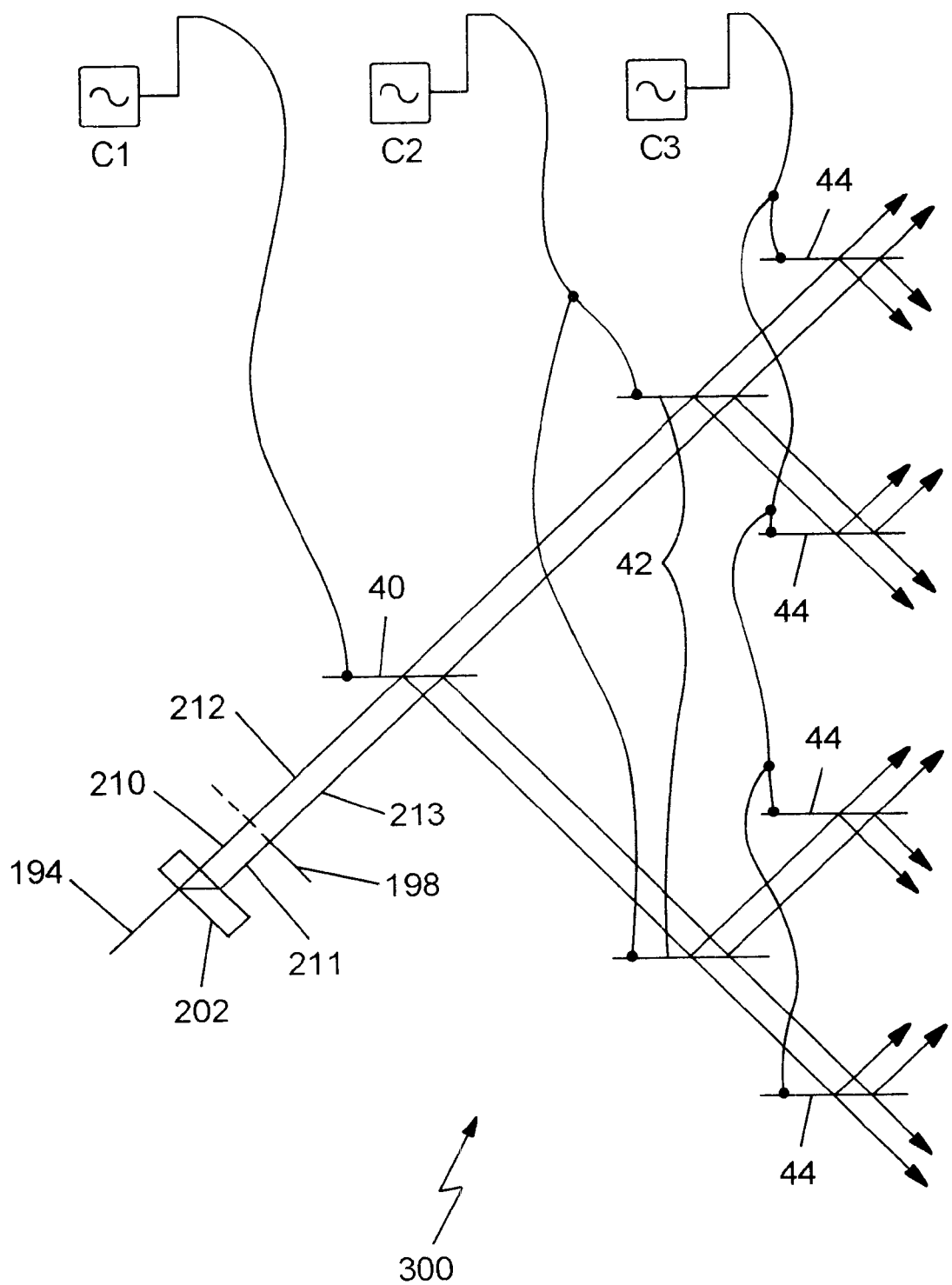
FIG. 17 is a schematic representation of a canonical polarization insensitive optical switching, routing, and time delay system of this invention incorporating electrically switchable mirrors therein.

For example, FIG. 17 illustrates polarization independent switching system 300 where polarization independent switching performance is obtained by adding a front-end to the basic switching system of FIG. 5. The front-end of optical system 300 of FIG. 17 includes a polarizing beamsplitter 202 and pixellated retarder 198 as described earlier. Incident optical beam 194 is separated into two beams 210 and 211 containing orthogonal polarization components of input beam 194. The pixellated retarder 198 then modifies these two beams 210 and 211 so that they are polarized in the same polarization state (typically chosen to be the polarization state in which the subsequent switching stages perform with highest efficiency, throughput, contrast, speed, etc.). These 'twin' beams 212 and 213 then propagate through the same optical switching and routing system 50 of FIG. 5. No added complexity is required of the switching system 50, except for possibly requiring slightly larger reflective pixels, since the 'twin' beams, although spatially separated, propagate through the switching system as a single beam. Each is reflected or transmitted by the same reflective pixels and no additional driver complexity is needed. In this fashion the 'twin' beams are switched to one or multiple output locations.

If desired, the process can be completed as described earlier by including the rear-end described in FIGS. 13a and 14. This rear-end consists of pixellated retarder 200 followed by polarizing combiner 204. All the beams exit system 300 parallel to one of two different directions. A fixed segmented mirror array can be used to align all beams in a single direction, or alternatively a propagation distance on the order of the size of the switch can be traversed to allow the two groups of exit beams to separate. In either of these two cases, the pixellated retarder array and polarizing combiner can readily be applied to form single output beams exiting each of the ports to which the input beam was steered or routed to.

Although the invention has been described with respect to various embodiments, it should be realized this invention is also capable of a wide variety of further and other embodiments within the spirit and scope of the appended claims. It should be further noted that each of the systems described above may be reversed or used bi-directionally.

What is claimed is:

1. An optical system for producing an attenuated or directed signal, comprising:
    means for receiving at least one incident signal of electromagnetic radiation;
    attenuating/directing means for accepting said at least one incident signal of electromagnetic radiation from said receiving means and for providing at least one attenuated or directed output signal of electromagnetic radiation, said attenuating/directing means including a single stage comprising a switchable mirror;
    means operably associated with said single stage for controlling said switchable mirror in such a manner as to attenuate said at least one incident signal as it strikes said switchable mirror;
    said controlling means further preselectively controlling the amount of said attenuation of said at least one incident signal;
    said switchable mirror directing said at least one incident signal to at least one of two angular directions;
    means operably associated with said single stage for controlling the amount of said at least one incident signal directed to said at least one of said two angular directions; and
    means for outputting said at least one incident signal after it propagates into and out of/from said switchable mirror in free space.

2. The optical system as defined in claim 1 wherein said controlling means comprises a controllable voltage source electrically connected to said switchable mirror.

3. The optical system as defined in claim 1 wherein said at least one incident signal directed to said at least one of two angular directions is also directed to at least one of two spatial locations.

4. The optical system as defined in claim 1 wherein said switchable mirror comprises a volume holographic optical component.

5. The optical system as defined in claim 1 further comprising:
    said switchable mirror having two separately controllable segments;
    means operably associated with said single stage for separating orthogonal polarization components of said incident signal into separate signals which are incident separately on said at least two separately controllable segments of said switchable mirror; and
    means operably associated with said single stage for combining said orthogonal polarization components of said incident signal from said separate signals.

6. The optical system as defined in claim 4 wherein said controlling means comprises a controllable voltage source electrically connected to said switchable mirror.

7. The optical system as defined in claim 5 wherein said switchable mirror comprises a volume holographic optical component.

8. An optical system for producing an attenuated or directed signal, comprising:
    directing means for receiving at least one incident signal of electromagnetic radiation and for providing at least one attenuated output signal of electromagnetic radiation, said directing means including a single stage comprising a switchable mirror;
    means operably associated with said single stage for controlling said switchable mirror in such a manner as to attenuate said at least one incident signal as it strikes said switchable mirror;
    said controlling means further preselectively controlling the amount of said attenuation of said at least one incident signal;
    means located on one side of said single stage for separating said at least one incident signal of electromagnetic radiation into two electromagnetic radiation signals, each signal containing orthogonal polarization components;
    means operably associated with said single stage for rotating one of said signals with respect to the polarization of the other of said signals prior to striking said switchable mirror;
    means located on another side of said single stage for rotating one of said signals with respect to the polarization of the other of said signals after striking said switchable mirror;
    means operably associated with said single stage for combining said separated signals of electromagnetic radiation; and
    said at least one incident signal propagates into and out of/from said switchable mirror in free space to provide attenuation or direction of said at least one input signal insensitive to polarization.

9. The optical system as defined in claim 8 wherein said controlling means comprises a controllable voltage source electrically connected to said switchable mirror.

10. The optical system as defined in claim 8 wherein said switchable mirror comprises a volume holographic optical component.

11. An optical system as defined in claim 8 further comprising:
   another means located on said one side of said single stage for rotating one of said signals with respect to the polarization of the other of said signals after striking said switchable mirror; and
   another means operably associated with said single stage for combining said separated signals of electromagnetic radiation.

12. An optical system for producing an attenuated signal, comprising:
   directing means for receiving at least two incident signals of electromagnetic radiation and for providing at least two attenuated output signals of electromagnetic radiation, said directing means including a single stage comprising a switchable mirror;
   said switchable mirror comprising a pixelated reflective optical component;
   means operably associated with said single stage for controlling said pixilated switchable mirror in such a manner as to attenuate said at least two incident signals as it strikes said switchable mirror;
   said controlling means further preselectively controlling the amount of said attenuation of said at least two incident signals; and
   said at least two incident signals propagating into and out of/from said pixilated switchable mirror in free space.

13. The optical system as defined in claim 12 wherein said pixlated switchable mirror further comprises a volume holographic optical component.

14. An optical system for producing an attenuated or directed signal, comprising:
   directing means for receiving at least two incident signals of electromagnetic radiation and for providing at least two attenuated output signals of electromagnetic radiation, said directing means including a single stage comprising a switchable mirror;
   said switchable mirror comprising a pixelated reflective optical component;
   means operably associated with said single stage for controlling said pixilated switchable mirror in such a manner as to attenuate said at least two incident signals as it strikes said switchable mirror;
   said controlling means further preselectively controlling the amount of said attenuation of said at least two incident signals;
   means located on one side of said single stage for separating each of said at least two incident signals of electromagnetic radiation into two electromagnetic radiation signals, each of the two electromagnetic radiation signals containing orthogonal polarization components;
   means operably associated with said single stage for rotating one of the two electromagnetic radiation signals containing orthogonal polarization components with respect to the polarization of the other prior to striking said pixelated switchable mirror;
   means located on another side of said single stage for rotating one of the two electromagnetic radiation signals containing orthogonal polarization components with respect to the polarization of the other after striking said pixelated switchable mirror;
   means operably associated with said single stage for combining said separated signals of electromagnetic radiation; and
   said at least two incident signals propagates into and out of/from said switchable mirror in free space to provide attenuation or direction of said at least two input signals insensitive to polarization; and
   said at least two incident signals propagating into and out of/from said pixilated switchable mirror in free space.

15. The optical system as defined in claim 14 wherein said controlling means comprises a controllable voltage source electrically connected to said switchable mirror.

16. The optical system as defined in claim 14 wherein said switchable mirror comprises a volume holographic optical component.

* * * * *